United States Patent
Peterson et al.

(10) Patent No.: US 6,663,058 B1
(45) Date of Patent: Dec. 16, 2003

(54) ADJUSTABLE GAME CONTROLLER MOUNT

(76) Inventors: Craig Peterson, 4028 Knoll Pl., Racine, WI (US) 53403; Jeff D'Acquisto, 2432 N. Sylvania Ave., Franksville, WI (US) 53126

(*) Notice: Subject to any disclaimer, the term of this patent is extended or adjusted under 35 U.S.C. 154(b) by 0 days.

(21) Appl. No.: 10/154,225

(22) Filed: May 23, 2002

(51) Int. Cl.[7] .............................................. F16M 13/00
(52) U.S. Cl. ..................... 248/125.9; 248/130; 273/309
(58) Field of Search ........................... 248/125.1, 125.3, 248/125.8, 125.9, 127, 146, 121, 130; 273/148 R, 309

(56) References Cited

U.S. PATENT DOCUMENTS

| | | | |
|---|---|---|---|
| 3,405,894 A | * 10/1968 | Jordan et al. ............... 248/662 |
| 4,036,465 A | * 7/1977 | Kellner ...................... 248/463 |
| D260,823 S | 9/1981 | Stulik, Jr. |
| 4,461,470 A | 7/1984 | Astroth et al. |
| 4,494,754 A | 1/1985 | Wagner, Jr. |
| 4,648,603 A | 3/1987 | Hayford, Jr. |
| 5,195,746 A | 3/1993 | Boyd et al. |
| D334,487 S | 4/1993 | Perry |
| 5,290,034 A | 3/1994 | Hineman |
| 5,419,613 A | 5/1995 | Wedeking |
| 5,437,453 A | 8/1995 | Hineman |
| 5,573,320 A | 11/1996 | Shearer |
| 5,911,634 A | 6/1999 | Nidata et al. |
| 5,992,805 A | * 11/1999 | Tanner ....................... 248/161 |
| 6,033,014 A | 3/2000 | Nightengale |
| 6,044,772 A | 4/2000 | Gaudette et al. |
| 6,083,106 A | 7/2000 | McDowell |
| 6,089,663 A | 7/2000 | Hill |
| 6,102,344 A | * 8/2000 | Kasvin et al. ............... 248/118 |

OTHER PUBLICATIONS

Patent Application Publication No. US 2001/0035479 A1 to Roebuck, publication date Nov. 1, 2001.*

* cited by examiner

Primary Examiner—Ramon O. Ramirez
(74) Attorney, Agent, or Firm—Jansson, Shupe & Munger, Ltd.

(57) ABSTRACT

A device for supporting a controller, such as a game controller, at an adjustable position above the ground. The device includes frame which rests on the ground and a controller mount pivotably connected with respect to the frame. The controller mount provides for releasable attachment to the controller. The height of the controller mount and the angle between the frame and the controller mount are independently adjustable.

19 Claims, 3 Drawing Sheets

ADJUSTABLE GAME CONTROLLER MOUNT

FIELD OF THE INVENTION

This invention is related generally to structures and devices for supporting controllers and, more particularly, to such structures and devices for supporting video game controllers.

BACKGROUND OF INVENTION

The use of video technology in games, simulators and educational devices is already widespread and is continuing to increase. Such games and devices typically require the user to provide input through a controller which may be a joystick, paddle, multi-button controller, vibrational controller, steering wheel or others. Typical controllers are held by the user's hands or supported on the user's lap.

Some controllers, particularly those of the steering wheel type, are difficult to operate without being firmly anchored. This is especially true in racing type games and simulators which require quick rotation of the steering wheel and constant attention to the video display which prevents the user from adjusting the steering wheel support.

In addition, steering wheel controllers are also difficult to mount in comfortable positions for every user. For use with video games, users typically require the controllers to be mounted in a variety of positions depending on the user's need. For instance, a user may play the game from a standing position or from a sitting position on the ground or on a sofa, chair, recliner, stool, etc. In addition, there may be a wide variety in heights of users from a small child to a large man. Users may also have widely differing individual tastes in the height or angle of the steering wheel even if used with the same chair or the like.

Mounting devices for supporting controllers are known in the prior art. However, they do not provide sufficient adjustability, nor ability of use with such a wide variety of positions required by diverse user preferences.

One such mounting device is disclosed by U.S. Pat. No. 6,044,772 to Gaudette et al. The Gaudette et al. controller stand uses a tubular support frame which provides for integrated steering wheel height and angle adjustment. Such a device allows for placement of the steering wheel at a fixed distance from the frame's pivot, but does not allow for independent adjustment of the height and angle of the steering wheel mount. In addition, the stand is large and cumbersome and is not suited for easy set-up, adjustment or storage.

Another mounting device is disclosed in U.S. Pat. No. 6,083,106 to McDowell. The McDowell race car simulator assembly also provides for integrated steering wheel height and angle adjustment. Again, this device does not allow for the independent adjustment of height and angle. The simulator assembly also requires use with a specific seat and is not adapted for use with a variety of user positions. Such a device is limited in its operation and does not appear designed for in home use with video games. Furthermore, the McDowell device is bulky and does not provide for easy installation or storage.

Neither the Gaudette et al. nor the McDowell devices are designed for easy use at heights associated with normal chairs, sofas, etc. Because the angle and height of the steering wheel are adjustable at the pivot at the forwardmost end of the devices, the devices must have a long base along the ground to provide sufficient balance to the device. Such a design typically is not appropriate for use in normal video game playing situations.

Game controllers are typically very easy to stow away when not in use. Such an ability is an important consideration when the controllers are intended for use in a room which is used for other purposes, such as entertaining guests. As stated above, typical prior art devices for mounting steering wheel controllers are cumbersome and are not adapted for easy removal and storage. A game controller mounting device which is easy to move and stow away would be a valuable improvement over the prior art.

While video "gaming" is often enjoyed by lone individuals, groups of friends also enjoy to compete or otherwise play together. In such situations, the users are seated at a variety of positions from which each can view the video screen. When a player is done with his turn, the game controller is passed to the next player. While such an process is easy to perform with a non-supported game controller, a controller mounted to a support or stand typically cannot conveniently moved. Therefore, it would an important improvement over the prior art to provide a controller mount which is able to be moved from position to position and adjusted such that the friends do not need to exchange positions.

Therefore, there is a continuing significant need in the field of video technology, particularly with the use of steering wheel controllers, for improvements in the mounting of such controllers while providing for complete adjustability and convenience of use, while retaining simplicity and easy installation and storage.

OBJECTS OF THE INVENTION

It is an object of the invention to provide an improved device for supporting a controller at an independently adjustable height and angle.

Another object of the invention is to provide an improved device for supporting a game controller which is adapted for quick installation.

Another object of the invention is to provide an improved device for supporting a controller which is non-complex in design and allows easy storage.

Another object of the invention is to provide an improved device for supporting a controller which is compact and can fit in tight areas.

Another object of the invention is to provide an improved device for firmly anchoring a controller while providing easy release of the controller when desired.

Another object of the invention to provide an improved device for supporting a controller which can be used with a variety of chairs, sofas and the like.

Still another object of the invention is to provide an improved device for supporting a controller which utilizes a limited number of parts and has substantial durability.

These and other objects of the invention will be apparent from the following descriptions and from the drawings.

SUMMARY OF THE INVENTION

This invention is an improved device for supporting a controller, such as a game controller, at an adjustable position above the ground. The invention represents a significant advance over the state of the art by providing novel capabilities, including the ability to independently adjust the height of the controller and the angle of the controller.

The device includes a frame which rests on the ground and has an adjustable height, preferably telescopically adjustable, and a controller mount pivotably connected with respect to the frame. The controller mount provides for attachment to the game controller. Through the adjustment of the height of the frame and the angle between the frame and the controller mount, the height and angle of the controller are independently adjusted.

The frame preferably includes first and second legs. Each leg preferably has a support surface for engaging the ground. The frame also preferably includes a crossbar which interconnects the legs. The controller mount is preferably pivotably connected to the crossbar.

The controller mount preferably includes a sleeve-like portion which receives the frame. The sleeve-like portion preferably rotates about the frame to allow the controller mount to pivot. More preferably, the sleeve-like portion preferably receives the crossbar and the sleeve-like portion rotates about the crossbar to allow the controller mount to pivot.

In another embodiment, the device for supporting a game controller at an adjustable position above the ground comprises a frame having an end and an adjustable length, a support surface connected with respect to the end of the frame for standing on the ground and stabilizing the device, and a controller mount pivotably connected with respect to the frame and providing for releasable attachment to the game controller. The end of the frame preferably includes a foot which projects from the frame at a substantially perpendicular angle and includes the support surface. The embodiment allows for independent adjustment of the distance and the angle between the controller mount and the ground.

In this embodiment, the controller mount preferably includes a mounting plate for attachment to the game controller. More preferably, the mounting plate provides for releasable attachment to the game controller via hook and loop fasteners. The controller mount also preferably includes a sleeve-like portion which receives the frame to allows the mounting plate to pivot with respect to the frame when the sleeve-like portion rotates around the frame. The sleeve-like portion preferably includes at least one bore for receiving a screw to lock the sleeve-like portion in position relative to the frame.

In this embodiment, the frames preferably includes first and second portions. The first portion preferably has a cavity and is dimensioned to receive the second portion within the cavity to provide for telescopic length adjustment of the frame.

In an alternative embodiment, the device for supporting a game controller at an adjustable position above the ground comprises (1) a frame which includes first and second legs of adjustable length and a substantially linear middle portion which interconnects the legs, (2) a first support surface at the end of the first leg for standing on the ground and stabilizing the device, (3) a second support surface at the end of the second leg for standing on the ground and stabilizing the device, and (4) a controller mount rotatably connected to the middle portion and providing for releasable attachment to the game controller. Such an alternative embodiment allows the independent adjustment of the distance between the controller mount and the ground and the angle between the controller mount and the frame.

In this alternative embodiment, the controller mount preferably includes a mounting plate for attachment to the game controller. More preferably, the mounting plate provides for releasable attachment to the game controller via hook and loop fasteners. The controller mount also preferably includes a sleeve-like portion which receives the middle portion to allow the mounting plate to pivot with respect to the frame when the sleeve-like portion rotates around the frame. The sleeve-like portion preferably includes at least one bore for receiving a screw to lock the sleeve-like portion in position relative to the middle portion of the frame.

Each leg preferably includes first and second portions with each first portion having a cavity and being dimensioned to receive the corresponding second portion within the cavity to provide for telescopic length adjustment of the frame.

The first support surface and second support surface are preferably planar members which project from each respective leg at a substantially perpendicular angle.

DETAILED DESCRIPTION OF PREFERRED EMBODIMENTS

Figure 1:
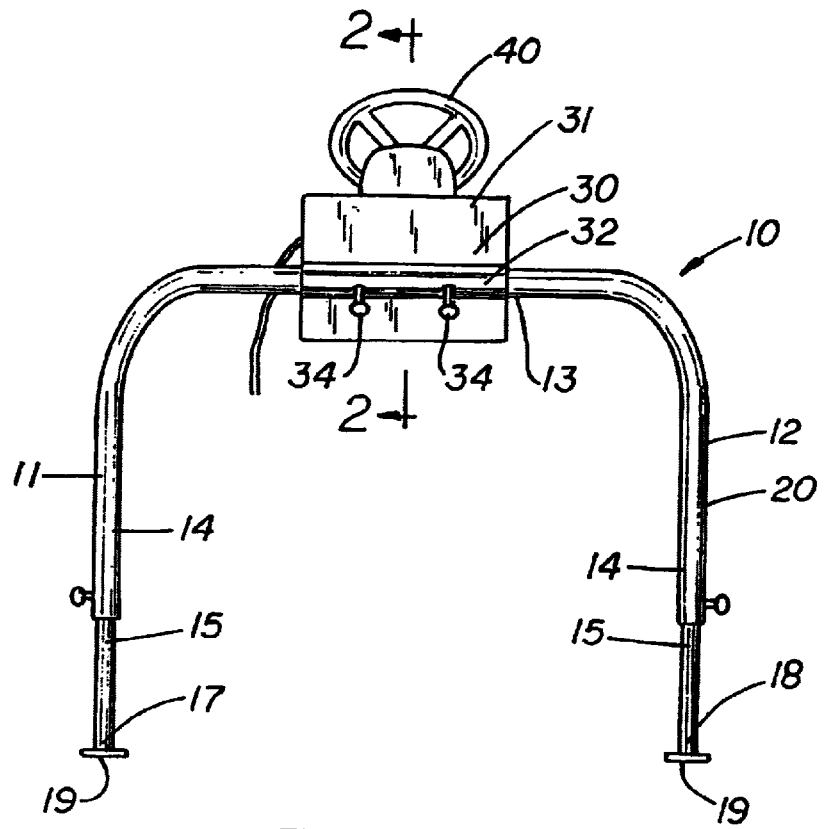
FIG. 1 is an rear plan view of the controller mount along with a controller in accordance with the principles of the present invention.
Figure 2:
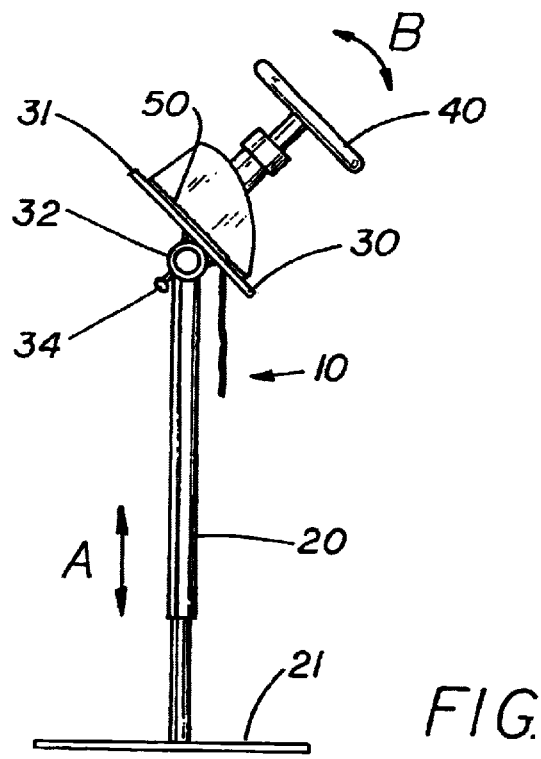
FIG. 2 is a cross section view of the controller mount along with a controller taken along line 2 in FIG. 1 in accordance with the principles of the present invention.7
Figure 3:
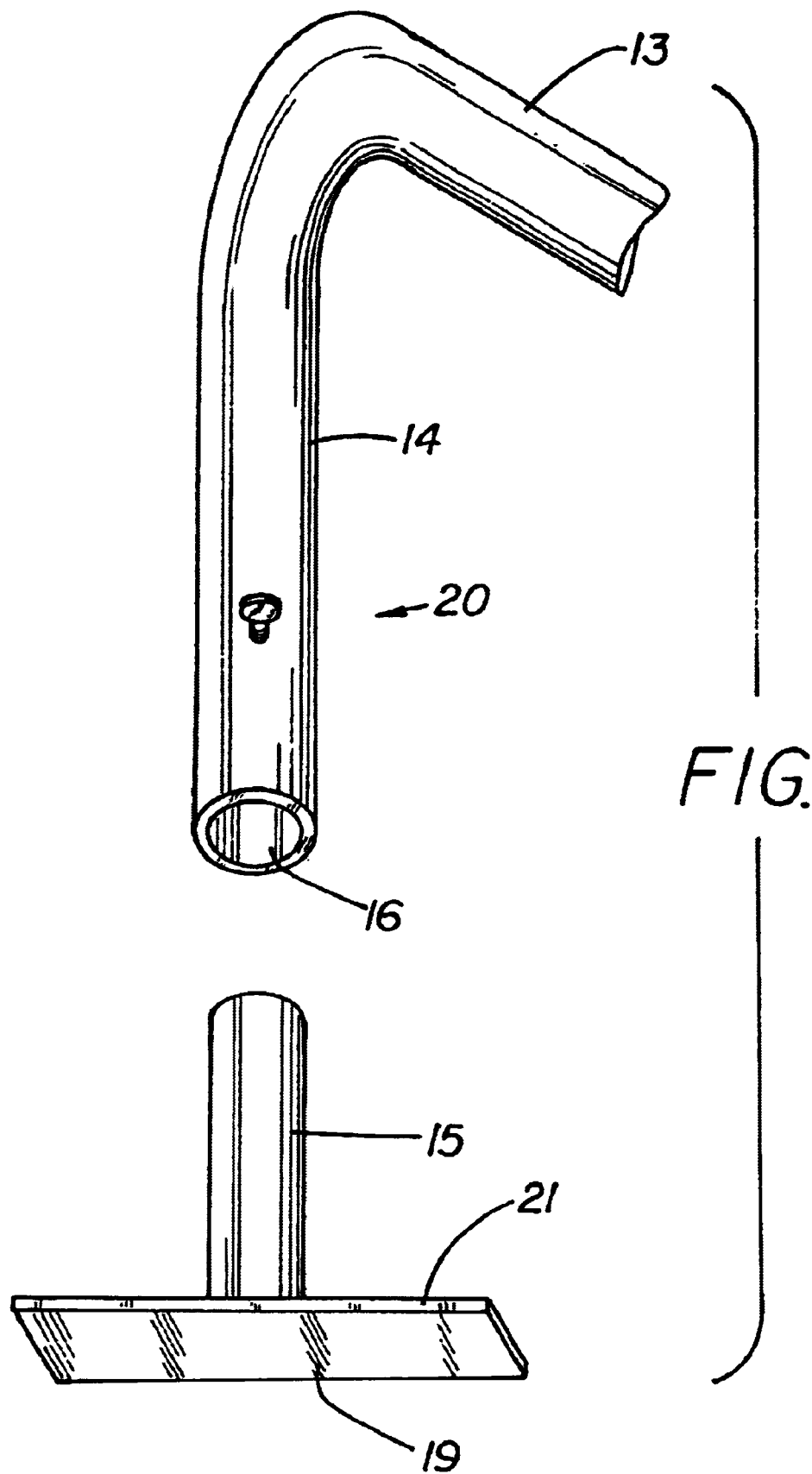
FIG. 3 is a perspective view of the first and second portions of the frame in accordance wits principles of the present invention.
Figure 4:
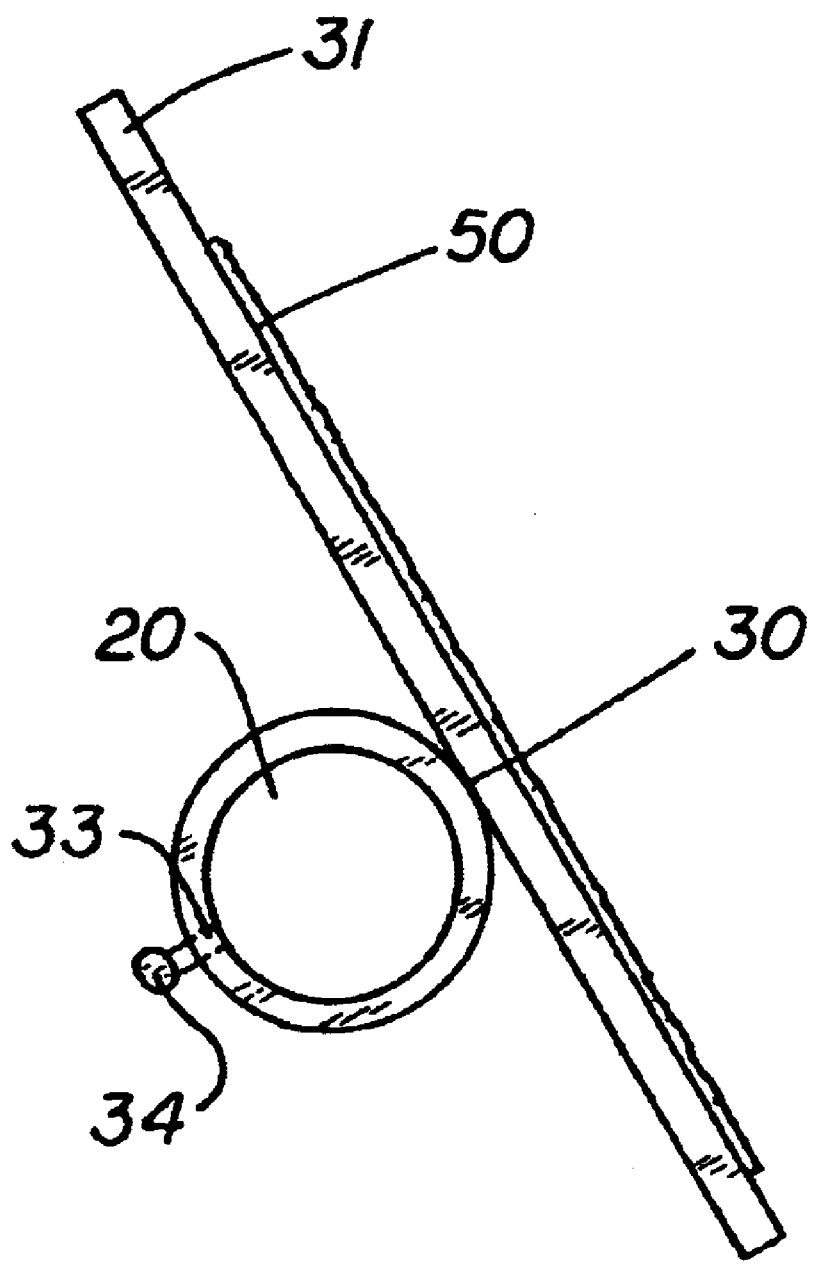
FIG. 4 is a cross section view of the connection between the sleeve potion and the mounting plate in accordance with the principles of the present invention.

FIG. 1 is a plan view taken from the perspective of the video screen of the adjustable device 10. A controller 40 is shown mounted to the controller mount 10. The device 10 includes a frame 20 which has a first leg 11 and a second leg 12 which are interconnected by a crossbar or substantially linear middle portion 13. The legs 11, 12 have an adjustable height. Each leg 11,12 includes a first portion 14 and a second portion 15. Each first portion 14 has a cavity 16 which is dimensioned to receive the corresponding second portion 15 to provide for telescopic length adjustment of the frame (as shown in FIG. 3). First leg 11 has a first end 17 and a second leg 12 has a second end 18 which include support surfaces 19. The first and second support surfaces 19 are shown as planar members which project from each respective leg at a substantially perpendicular angle. As shown in FIG. 2, feet 21 project from each respective leg at a substantially perpendicular angle and include support surfaces 19.

The device 10 includes a controller mount 30 rotatably connected to the middle portion 13. Controller mount 30 includes mounting plate 31 which is generally planar. Controller mount 30 provides for releasable attachment to game controller 40 via hook and loop fasteners 50 which are connected to mounting plate 31 and game controller 40. Controller mount 30 also includes a sleeve-like portion 32 which receives middle portion 13 to allow mounting plate 31 to pivot with respect to frame 20 when sleeve-like portion 32 rotates around frame 20. Sleeve-like portion 32 includes at least one bore 33 for receiving a screw 34 to lock sleeve-like portion 32 in position relative to the middle portion 13 of the frame 20.

The arrows in FIG. 2 demonstrate the direction of adjustment which can be performed by the novel device 10. Arrows "A" demonstrate the height adjustment which is performed telescopically by frame 20. Arrows "B" demonstrate the angle adjustment of the controller mount 30. As can be seen, such adjustments can be performed independently of one another. In this manner, controller mount 30 can be pivoted about frame 20 without movement of adjustment of frame 20. Likewise, the height of frame 20, and thus the height of controller mount 30 and controller 40, can be adjusted without changing the angle between controller mount 30 and frame 20 or the ground.

Thus, it should be apparent that there has been provided, in accordance with the present invention, a device for providing support to a controller at a position which is independently height and angle adjustable that fully satisfies the objectives and advantages set forth above.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A device for supporting a game controller at an adjustable position above the ground comprising:
   a frame including first and second legs and a substantially linear middle portion interconnecting the legs, the legs having adjustable lengths and first and second ends respectively;
   a first support surface at the first end, the first support surface for standing on the ground and stabilizing the device;
   a second support surface at the second end, the second support surface for standing on the ground and stabilizing the device; and
   a controller mount rotatably connected to the middle portion, the controller mount providing for releasable attachment to the game controller;
   whereby the distance between the controller mount and the ground and the angle between the controller mount and the frame are independently adjustable.

2. The device of claim 1 wherein the controller mount includes a mounting plate for attachment to the game controller.

3. The device of claim 2 wherein the mounting plate provides for releasable attachment to the game controller via hook and loop fasteners.

4. The device of claim 2 wherein the controller mount includes a sleeve-like portion which receives the middle portion to allow the mounting plate to pivot with respect to the frame when the sleeve-like portion rotates around the frame.

5. The device of claim 4 wherein the sleeve-like portion includes at least one bore for receiving a screw to lock the sleeve-like portion in position relative to the middle portion of the frame.

6. The device of claim 1 wherein each leg includes first and second portions, each first portion having a cavity and being dimensioned to receive the corresponding second portion within the cavity to provide for telescopic length adjustment of the frame.

7. The device of claim 1 wherein the first support surface and second support surface are planar members which project from each respective leg at a substantially perpendicular angle.

8. A device for supporting a game controller at an adjustable position above the ground comprising:
   a frame having an end and an adjustable length;
   a support surface connected with respect to the end of the frame for standing on the ground and stabilizing the device; and
   a controller mount pivotably connected with respect to the frame, the controller mount including a mounting: plate providing for releasable attachment to the game controller;
   whereby the distance and the angle between the controller mount and the ground are independently adjustable.

9. The device of claim 8 wherein the end of the frame includes a foot which projects from the frame at a substantially perpendicular angle and includes the support surface.

10. The device of claim 8 wherein the mounting plate provides for releasable attachment to the game controller via hook and loop fasteners.

11. The device of claim 8 wherein the controller mount includes a sleeve-like portion which receives the frame to allows the mounting plate to pivot with respect to the frame when the sleeve-like portion rotates around the frame.

12. The device of claim 11 wherein the sleeve-like portion includes at least one bore for receiving a screw to lock the sleeve-like portion in position relative to the frame.

13. The device of claim 8 wherein the frame includes first and second portions, the first portion having a cavity and being dimensioned to receive the second portion within the cavity to provide for telescopic length adjustment of the frame.

14. A device for supporting a game controller at an adjustable position above the ground comprising:
   a frame which has an adjustable height, the frame including first and second legs and a crossbar interconnecting the legs; and
   a controller mount pivotably connected with respect to the crossbar, the controller mount providing for attachment to the game controller;
   whereby the height of the controller mount and the angle between the frame and the controller mount are independently adjustable.

15. The device of claim 14 wherein the mounting plate provides for releasable attachment to the game controller.

16. The device of claim 14 wherein the height of the frame is telescopically adjustable.

17. The device of claim 14 wherein each leg has a support surface for engaging the ground.

18. The device of claim 14 wherein the controller mount includes a sleeve-like portion which receives the crossbar, the sleeve-like portion rotating about the crossbar to allow the controller mount to pivot.

19. The device of claim 18 wherein the sleeve-like portion includes at least one bore for receiving a screw to lock the sleeve-like portion in position relative to the crossbar.

* * * * *